US010562802B1

(12) United States Patent
Nicholas et al.

(10) Patent No.: US 10,562,802 B1
(45) Date of Patent: Feb. 18, 2020

(54) CYLINDRICAL BOTTLE CUTTER APPARATUS, SYSTEMS AND METHODS OF USING THE SAME

(71) Applicant: Creator's Stained Glass, Inc., Spring Grove, IL (US)

(72) Inventors: Ray Nicholas, Ingleside, IL (US); Jordan Anderson, Gurnee, IL (US); Ryan Nicholas, Ingleside, IL (US)

(73) Assignee: Creator's Stained Glass, Inc., Spring Grove, IL (US)

( * ) Notice: Subject to any disclaimer, the term of this patent is extended or adjusted under 35 U.S.C. 154(b) by 0 days.

(21) Appl. No.: 16/252,214

(22) Filed: Jan. 18, 2019

(51) Int. Cl.
    *C03B 33/14* (2006.01)
    *C03B 33/06* (2006.01)
    *B26D 7/01* (2006.01)

(52) U.S. Cl.
    CPC ............... *C03B 33/14* (2013.01); *B26D 7/01* (2013.01); *C03B 33/06* (2013.01); *B26D 2007/013* (2013.01)

(58) Field of Classification Search
    CPC ........... C03B 33/14; C03B 33/06; B26D 7/01; B26B 27/00; B26B 29/06; B21D 51/2615
    See application file for complete search history.

(56) References Cited

U.S. PATENT DOCUMENTS

| 2,582,078 A | * | 1/1952 | Solum | C03B 33/14 82/92 |
| 3,572,564 A | * | 3/1971 | Fleming | C03B 33/14 225/2 |
| 3,744,692 A | * | 7/1973 | Doyel | C03B 33/14 225/96 |
| 6,000,262 A | * | 12/1999 | Dries | B67B 7/30 72/125 |

* cited by examiner

*Primary Examiner* — Kenneth E Peterson
*Assistant Examiner* — Liang Dong
(74) *Attorney, Agent, or Firm* — Scherrer Patent & Trademark Law, P.C.; Stephen T. Scherrer; Monique A. Morneault

(57) ABSTRACT

A cylindrical bottle cutter apparatuses, systems and methods of using the same comprise a hollow cylindrical body comprising a slot within which a slidable spring-loaded blade is positioned. A bottle is placed within the cylindrical body, and the blade is positioned in the slot at the desired height to circumferentially cut the bottle when the blade is pushed against the bottle and the bottle is rotated within the cylindrical body.

17 Claims, 6 Drawing Sheets

CYLINDRICAL BOTTLE CUTTER APPARATUS, SYSTEMS AND METHODS OF USING THE SAME

TECHNICAL FIELD

The present invention relates to a cylindrical bottle cutter apparatuses, systems and methods of using the same. Specifically, the cylindrical bottle cutter apparatuses comprise hollow cylindrical body comprising a slot within which a slidable spring-loaded blade is positioned. A bottle is placed within the cylindrical body, and the blade is positioned in the slot at the desired height to circumferentially cut the bottle when the blade is pushed against the bottle and the bottle is rotated within the cylindrical body.

BACKGROUND

Bottle cutter apparatuses are known, but are difficult to use. There are many different techniques to cut a bottle, most involving a blade that scores the bottle circumferentially so that the same may be cracked, providing a clean separation at the score line. However, other techniques include using a hot wire or hot string in an attempt to break the bottle along a desired line. These techniques have proven to be difficult, and in many cases can be dangerous.

Specifically, the technique of wrapping a bottle with a hot wire or hot string is particularly difficult to produce a clean score line. In most cases, wrapping a hot wire or string around a bottle and attempting to crack along the string or wire leads to shattering of the bottle, which is, of course, very dangerous.

Another technique involves utilizing a high-speed spinning blade to score or cut a glass bottle. While this may be relatively quick and effective, the machines tend to be expensive and also dangerous in that the spinning blades could cause bodily damage. And if not properly used, the spinning blade can cause the bottle to break irregularly, also leading to a dangerous situation with glass shards.

The more common method to cut a bottle involves the afore-mentioned blade scoring of the bottle circumferentially around the bottle. Once scored, the bottle is then impinged by a tapping device to finish the separation of the bottle along the score line. Other techniques have also developed, including applying sources of hot and/or cold to the score line to effectuate the glass separation.

Indeed, bottle cutting jigs have been developed to make bottle cutting easier, less dangerous, and less expensive for users, especially hobbyists. FIG. 1 illustrates a popular, highly effective, and well-known bottle cutter. While the prior art bottle cutter shown in FIG. 1 can effectively and efficiently score a bottle for separation of the same, there are some notable drawbacks. First, it may be difficult to provide sufficient pressure of the blade against the bottle during scoring of the same. The score line should be relatively deep; the deeper the score line, the easier to separate the bottle along the score line while minimizing shattering or breakage of the bottle around the score line. However, the blade is held against the bottle via a spring, in the prior art illustrated in FIG. 1. If the spring is not sufficient, the score line will likely be weak or non-existent, making the separating of the bottle very difficult if not impossible to do cleanly. A need, therefore, exists for an improved bottle cutting apparatus. Specifically, a need exists for an improved bottle cutting apparatus that provides sufficient pressure on the blade to ensure that the score line imparted is sufficiently deep to effectuate clean separation of the glass.

Ideally, the score line should wrap around the exterior surface of the bottle circumferentially and meet at the end of the score line exactly where it started. Thus, when separated, the score line provides a clean break around the bottle. In many bottle cutters, however, it may be particularly difficult to control the score line to ensure that it meets exactly where it started. A need, therefore, exists for an improved bottle cutting apparatus that imparts a score line that effectively wraps circumferentially around an entirety of the bottle. Moreover, a need exists for an improved bottle cutting apparatus that allows the score line to effectively meet back where it started so that there is no gap when attempting to separate the glass along the score line.

Moreover, typical bottle cutter jigs are designed for a small number of bottle sizes—typically, standard wine-bottle sizes. This is so because oftentimes the components of the bottle cutting jig are stationary and immovable, and as such only certain sized bottles may be placed within the jig for cutting the same. However, it may be desirable to be able to score any size or shape bottle. Typical heretofore known bottle cutters that do allow for movement of elements to accommodate different sized bottles are typically difficult to use and do not provide effective scoring of the bottles. A need, therefore, exists for an improved bottle cutting apparatus that may accommodate different sized and shaped bottles. More specifically, a need exists for an improved bottle cutting apparatus having modular and easily movable elements that can be easily configured to accommodate the differences in sizes and shapes of bottles scored therein.

SUMMARY OF THE INVENTION

The present invention relates to a cylindrical bottle cutter apparatuses, systems and methods of using the same. Specifically, the cylindrical bottle cutter apparatuses comprise hollow cylindrical body comprising a slot within which a slidable spring-loaded blade is positioned. A bottle is placed within the cylindrical body, and the blade is positioned in the slot at the desired height to circumferentially cut the bottle when the blade is pushed against the bottle and the bottle is rotated within the cylindrical body.

To this end, in an embodiment of the present invention, a bottle cutting apparatus is provided. The bottle cutting apparatus comprises: A bottle cutting apparatus comprising: a cylindrical sleeve comprising a sidewall and a first end and a second end; a vertical slot within the side wall providing a passage from outside the sleeve to inside the sleeve; a slidable sled within the slot, wherein the slidable sled is configured to move up and down within the vertical slot; a tightening element on the sled configured to tighten the slidable sled in a position along the vertical slot; a shaft disposed through the slidable sled and the slot; and a cutting blade on a terminal end of the shaft, wherein the cutting blade is configured to score a surface of a glass bottle disposed within the sleeve.

In an embodiment, the tightening element comprises a screw and a backplate configured to tighten on an inside surface of the sleeve when the screw is tightened.

In an embodiment, the bottle cutting apparatus further comprises: a spacer within the sleeve, the spacer having an outer diameter and an inner diameter, the outer diameter configured to be positioned adjacent an inside surface of the sleeve, and the inner diameter configured to be positioned adjacent the glass bottle when disposed within the sleeve, the spacer configured to hold the glass bottle in the center of the sleeve.

In an embodiment, the bottle cutting apparatus further comprises a spring surrounding the shaft, wherein the spring is configured to bias the shaft away from the sleeve.

In an embodiment, the bottle cutting apparatus further comprises a pushbutton on the shaft, wherein the pushbutton is configured to push the shaft and the cutting blade within the inside of the sleeve when pressed.

In an embodiment, the bottle cutting apparatus further comprises a spring surrounding the shaft between the pushbutton and an outside surface of the sleeve, wherein the spring is configured to bias the shaft away from the sleeve.

In an embodiment, the bottle cutting apparatus further comprises a magnet on the sled and magnetically engaged to the spring.

In an embodiment, the shaft is removable from the slidable sled.

In an embodiment, the bottle cutting apparatus further comprises a base on a bottom end of the sleeve, the base comprising a surface configured to hold a glass bottle thereon.

In an embodiment, the bottle cutting apparatus further comprises at least one foot on a bottom surface of the base configured to hold the base on a support surface.

In an alternate embodiment of the present invention, a system for etching a score line in a glass bottle comprising the bottle cutting apparatus and a bottle disposed within the sleeve.

In yet another alternate embodiment of the present invention, a method for etching a score line in a glass bottle is provided. The method comprises the steps of: providing a bottle cutting apparatus comprising a cylindrical sleeve comprising a sidewall and a first end and a second end, a vertical slot within the side wall providing a passage from outside the sleeve to inside the sleeve, a slidable sled within the slot, wherein the slidable sled is configured to move up and down within the vertical slot, a tightening element on the sled configured to tighten the slidable sled in a position along the vertical slot, a shaft disposed through the slidable sled and the slot, and a cutting blade on a terminal end of the shaft, wherein the cutting blade is configured to score a surface of a glass bottle disposed within the sleeve; providing a glass bottle comprising an outside surface disposed within the sleeve; pushing the cutting blade against the surface of the glass bottle; rotating the glass bottle; and etching a score line circumferentially in the outside surface of the glass bottle.

In an embodiment, the method further comprises the steps of: moving the slidable sled along the vertical slot; and tightening the slidable sled in a position within the vertical slot via the tightening element.

In an embodiment, the tightening element further comprises a screw and a back plate, wherein the back plate is configured to tighten on an inside surface of the sleeve when the screw is tightened, the method further comprising the step of: tightening the back plate against the inside surface of the sleeve by tightening the screw.

In an embodiment, the bottle cutting apparatus further comprises a pushbutton on the shaft, wherein the pushbutton is configured to push the shaft and the cutting blade within the inside of the sleeve when pressed and a spring surrounding the shaft between the pushbutton and an outside surface of the sleeve, wherein the spring is configured to bias the shaft away from the sleeve, the method further comprising the step of: pressing the pushbutton to move the shaft toward the sleeve and engaging the cutting blade with the outside surface of the glass bottle.

In an embodiment, the method further comprises the step of: removing the shaft and the cutting blade from the slidable sled.

In an embodiment, the slidable sled comprises a magnet, the method further comprising the step of: magnetically adhering the spring to the magnet.

In an embodiment, the bottle cutting apparatus further comprises a base disposed on a bottom end of the sleeve, the method further comprising the steps of: disposing the bottle on the base; and rotating the glass bottle on the base when etching a score line in the outside surface of the glass bottle.

In an embodiment, the base comprises at least one foot on a bottom surface thereof, the method further comprising the step of: engaging the foot on a support surface.

In an embodiment, the method further comprises the step of: rotating the glass bottle on the base, wherein the base remains unmoving due to the engagement of the foot on the support surface.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a cylindrical bottle cutter apparatuses, systems and methods of using the same. Specifically, the cylindrical bottle cutter apparatuses comprise hollow cylindrical body comprising a slot within which a slidable spring-loaded blade is positioned. A bottle is placed within the cylindrical body, and the blade is positioned in the slot at the desired height to circumferentially cut the bottle when the blade is pushed against the bottle and the bottle is rotated within the cylindrical body.

Figure 1:
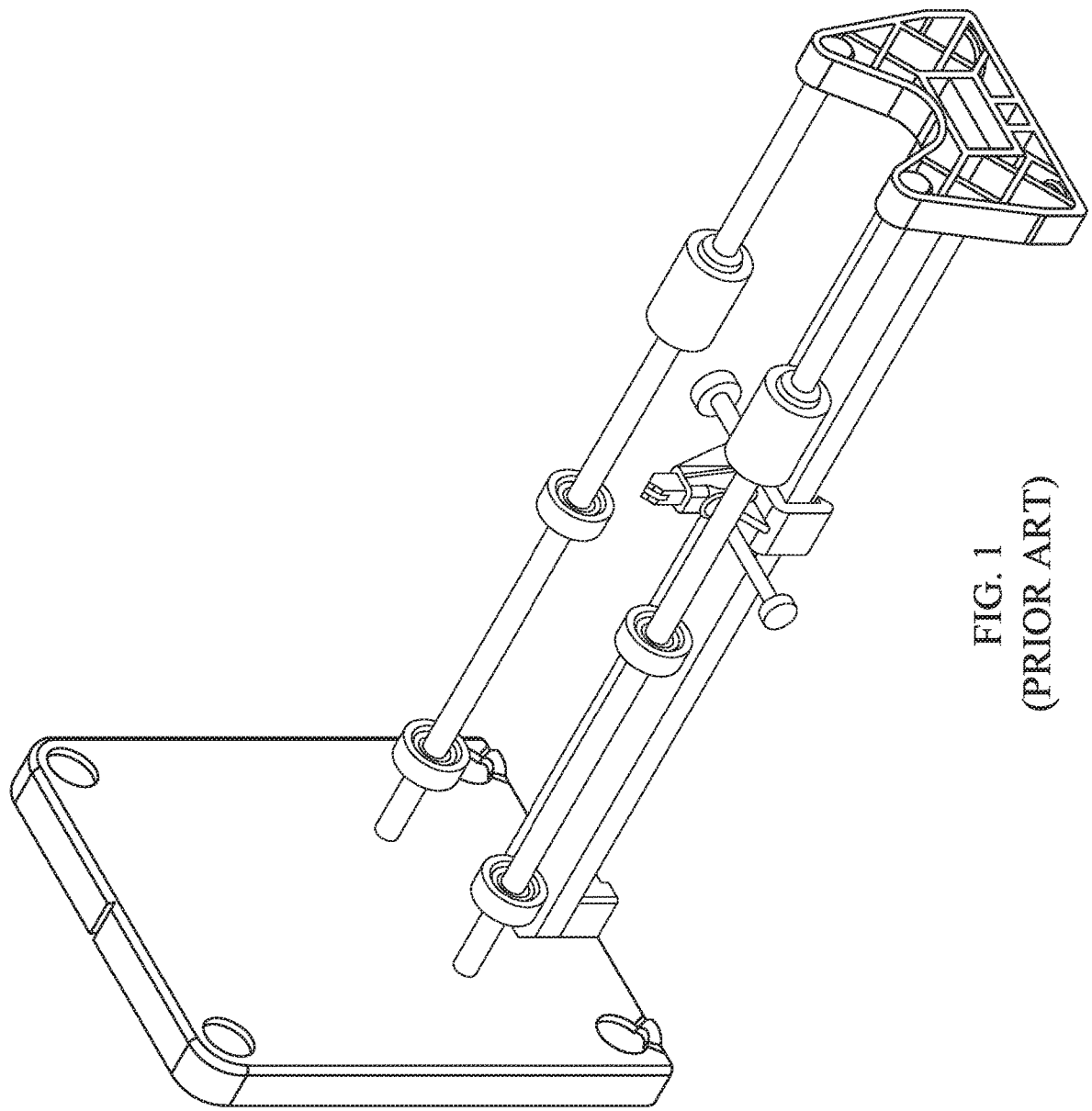
FIG. 1 illustrates a prior art bottle cutting apparatus.
Figure 2:
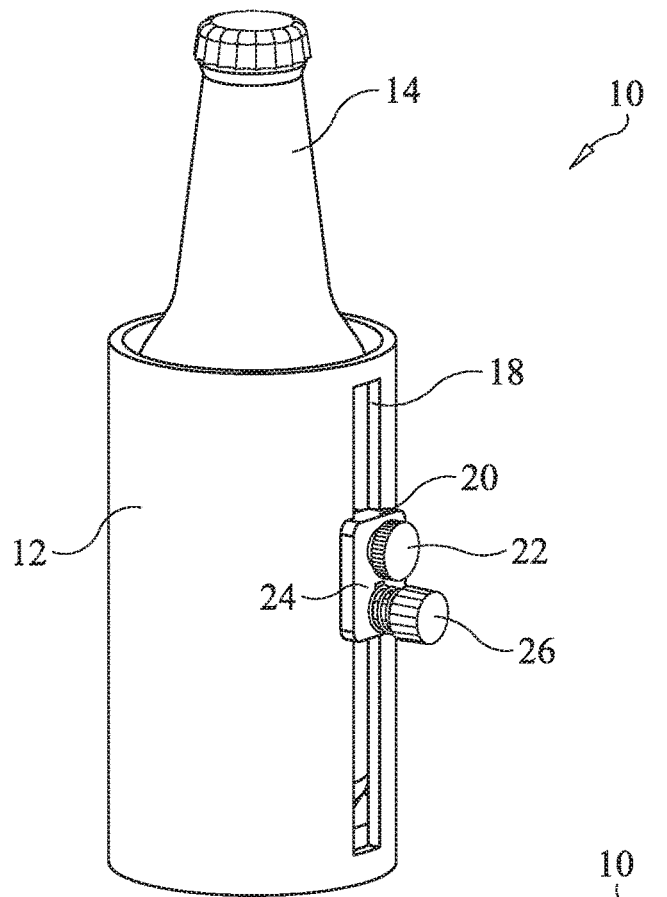
FIG. 2 illustrates a perspective view of a cylindrical bottle cutter apparatus having a bottle therein for cutting in an embodiment of the present invention.
Figure 4:
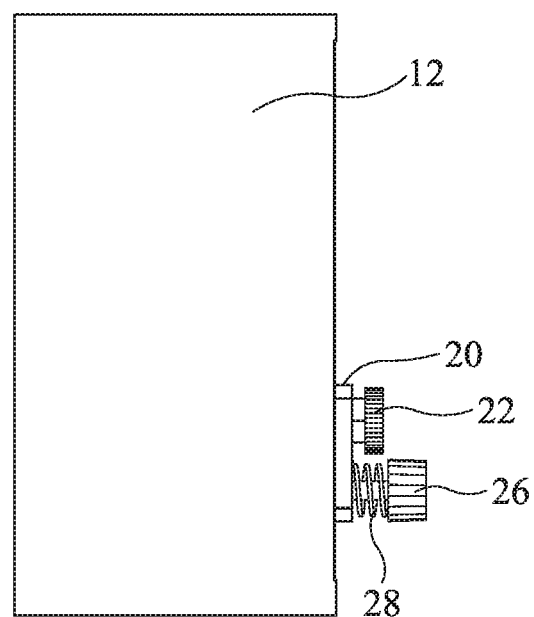
FIG. 4 illustrates a side view of a cylindrical bottle cutter apparatus with the cutting blade adjusted downwardly in an embodiment of the present invention.

Now referring to the drawings, wherein like numerals refer to like parts, a bottle cutting apparatus 10 is illustrated in an embodiment of the present invention. FIG. 2 illustrates a cylindrical bottle cutting apparatus 10 comprising a hollow cylindrical sleeve or body 12 in which a bottle 14 may be placed for cutting. On a side of the cylindrical body 12 may be a vertical slot 18 on which may be mounted a slidable sled 20 that may be adjusted up and down within the vertical slot for positioning thereof, as desired. Specifically, FIG. 2 illustrates the slidable sled 20 placed and held in a relatively high position within the slot 18. Alternatively, as illustrated in FIG. 4, the slidable sled 20 may be placed and held in a relatively low position within the slot 18.

Figure 5:
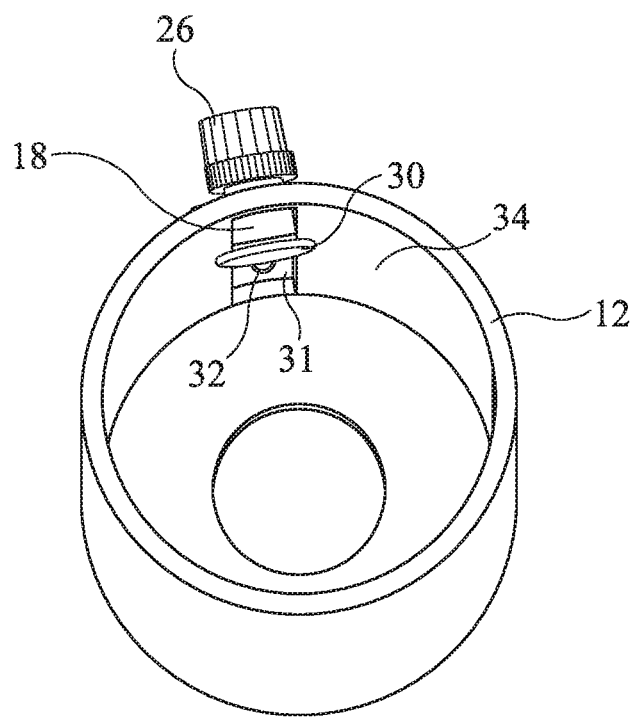
FIG. 5 illustrates a top view of a cylindrical bottle cutter apparatus in an embodiment of the present invention.

On the slidable sled 20 may be a tightening screw 22 that may be used for tightening the slidable sled 20 in desired positions within the slot 20. Specifically, the tightening screw 22 may have a tightening element 30, as illustrated in FIG. 5, disposed on an inside surface of the cylindrical body 12, wherein the tightening screw 22 may have a shaft running through the slot 20. Tightening the tightening screw 22 may cause the tightening element 30 to tighten onto the inside surface of the cylindrical body 12, thereby holding the slidable sled 20 in its desired position.

The slidable sled 20 may further have a cutting blade 32, as illustrated in FIG. 5, extending within the hollow cylindrical body 12 on a shaft 24 with a push button 26 on an end thereof. A spring 28 may be disposed around the shaft 24, biasing the push button 26, the shaft 24 and, therefore, the cutting blade 32 away from or otherwise toward the outside of the cylindrical body 12. Thus, the blade 32 may be positioned to allow a bottle to be placed within the cylindrical body 12, as illustrated in FIG. 2, without interfering with the placement of the bottle therein. Because the slidable sled 20 may be positioned in various locations along vertical slot 18, the cutting blade 32 may thus be placed in any desired location on the bottle 14 as desired, simply by moving the slidable sled and, therefore, the cutting blade 32 into the desired vertical position.

Figure 3:
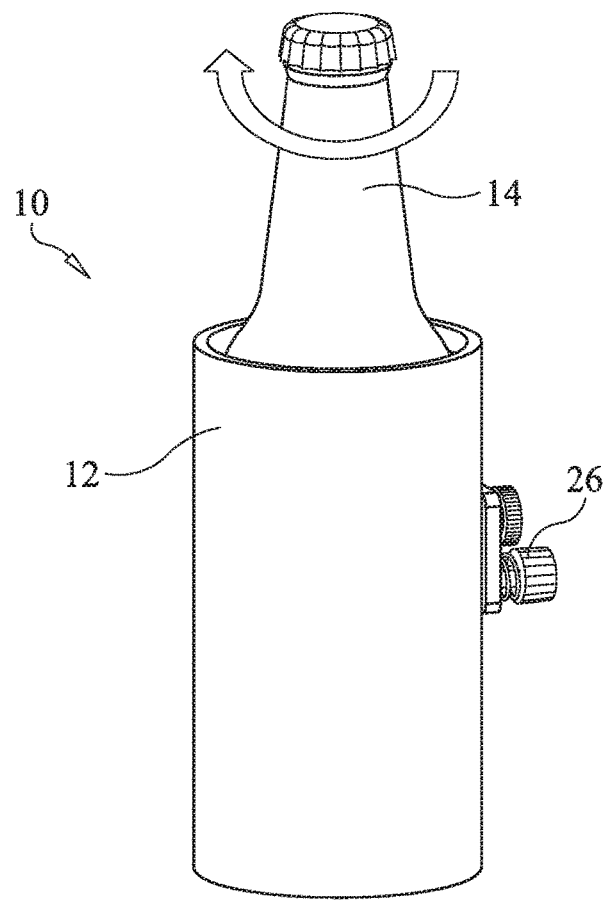
FIG. 3 illustrates a perspective view of a cylindrical bottle cutter apparatus manipulated by a user thereof to cut a bottle therein in an embodiment of the present invention.

As illustrated in FIG. 3, a user may depress the push button 26, thereby pushing the cutting blade 32 on the end of the shaft 24 into the glass of the bottle 14 placed therein. Holding the cutting blade 32 against the glass of the bottle 14, the user may rotate the bottle 14, thereby causing the cutting blade 32 to etch a groove into the bottle 14. As the bottle 14 rotates fully 360 degrees, the groove may be imparted fully around the circumference of the bottle 14. The bottle 14 may then be removed, and the groove etched in the bottle 14 may be used to cleanly break the bottle along the line of the groove.

FIG. 5 illustrates a top view of the cylindrical body 12, wherein the tightening element 30 is illustrated and the cutting blade 32 is shown. As illustrated, the tightening element 30 may be disc-shaped, and may further have a curve that conforms to the inside surface 34 of the body 12. When the tightening screw 22 is tightened, the tightening element 30 may be pulled and held against the inside surface 34 of the body 12, thereby holding the slidable sled 20 in its desired position. The slidable sled 20 further comprises a projection 31 extending into the slot 18, thereby maintaining the position of the sled 20 within the slot 18 as the sled 20 slides vertically within the slot 18.

Figure 6:
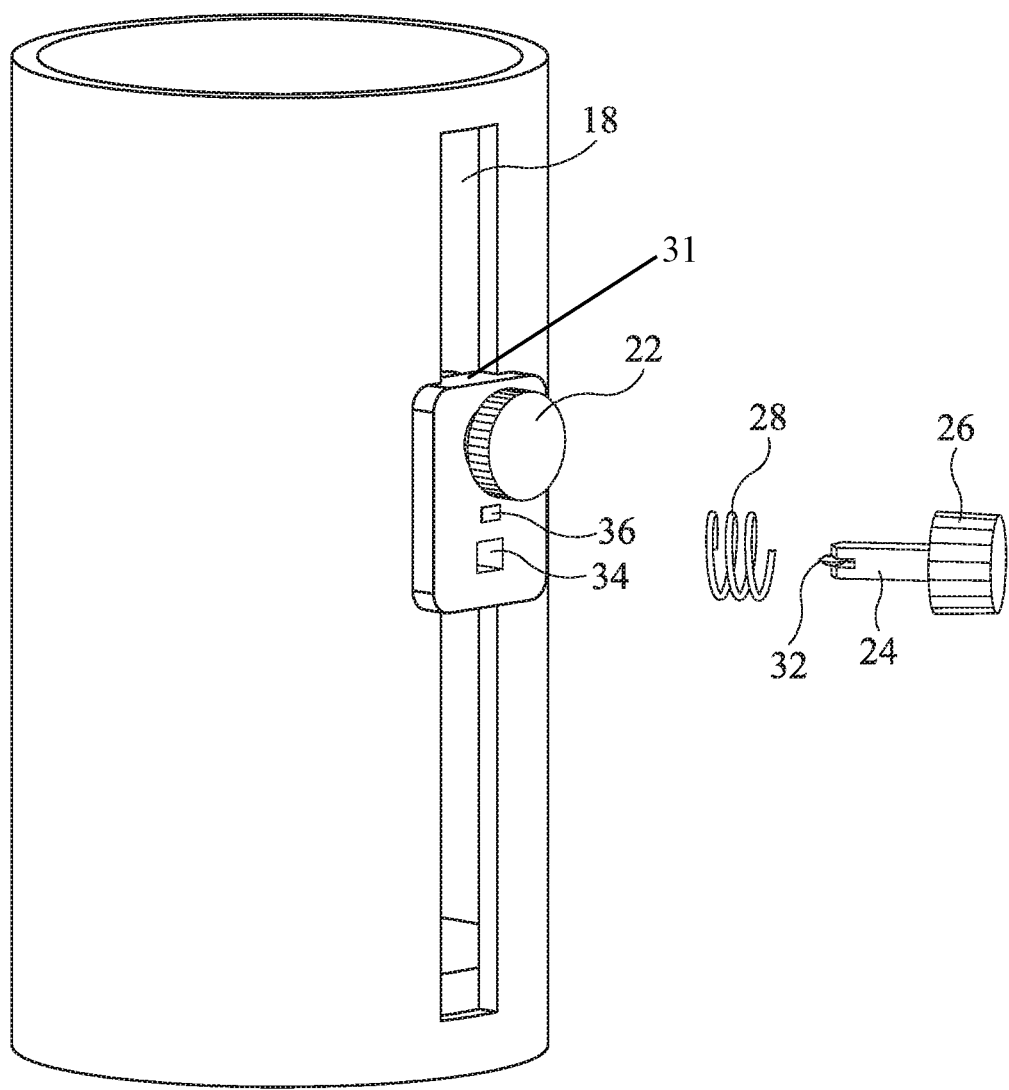
FIG. 6 illustrates an exploded view of a cylindrical bottle cutter apparatus, a spring and bottle cutting blade in an embodiment of the present invention.

FIG. 6 illustrates an exploded view of the body 12 having the slidable sled 20 held in position within the vertical slot 18. Spring 28 is shown, along with shaft 24 around which the spring normally is placed. Cutting blade 32 is illustrated positioned on the end of the shaft 24, with the push button 26 disposed on the opposite end thereof. A passage 35 on the slidable sled 20 may allow for placement of the shaft 24 therethrough, allowing the cutting blade 32 to be positioned within the cylindrical body 12. As noted above, the spring 28 may bias the pushbutton 28, and thus the shaft 24 and cutting blade 32 away from the inside of the cylindrical body 12. Pushing the push button 26 may allow the cutting blade to be pressed into the glass of the bottle 14, as described above. To better hold the spring 28 and, therefore, the shaft 24 in place within the passage 34, a magnet 36 may be positioned on or within the slidable sled 20, magnetically holding the spring 28 onto the slidable sled 20 so that they same may be held in place without falling and/or becoming lost.

Figure 7:
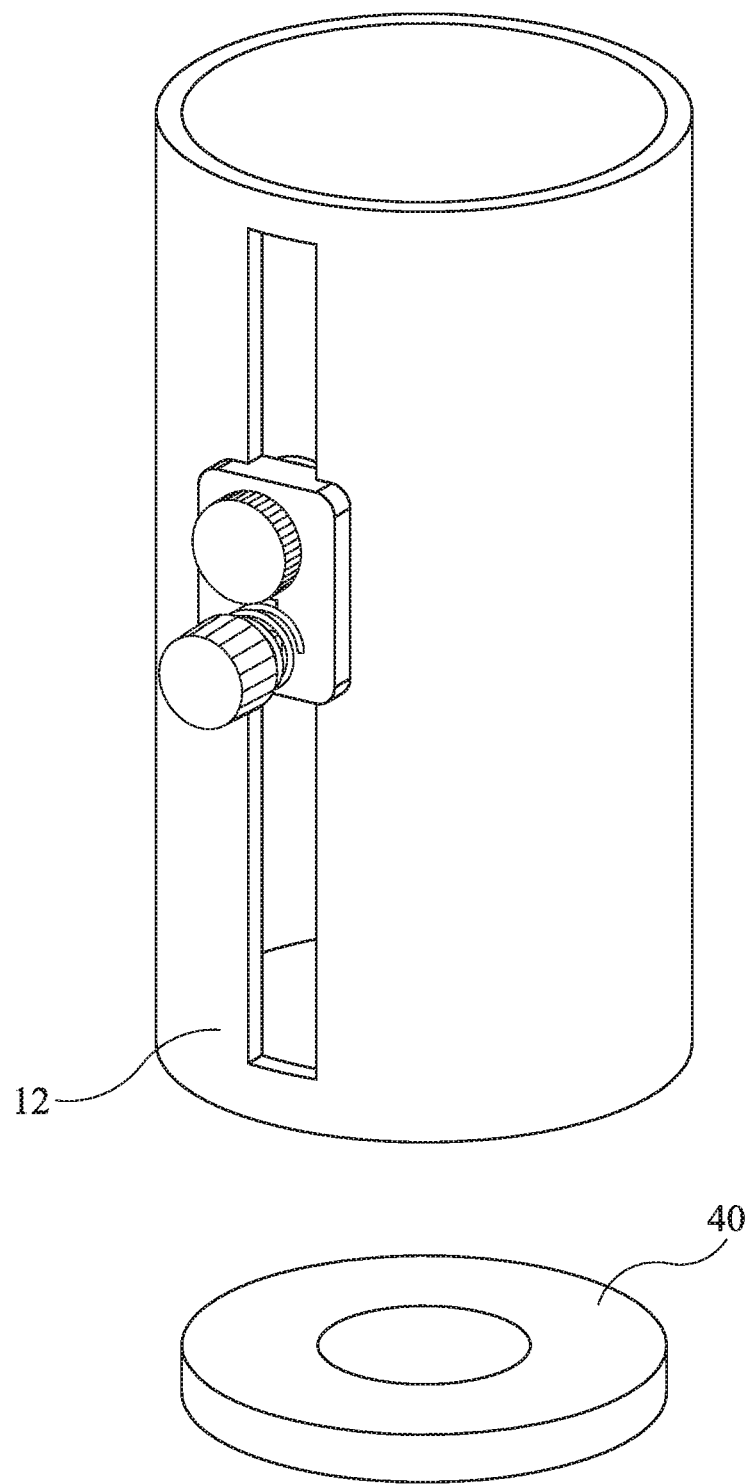
FIG. 7 illustrates an exploded view of a cylindrical bottle cutter apparatus and a base therein for resting bottles thereon in an embodiment of the present invention.
Figure 8:
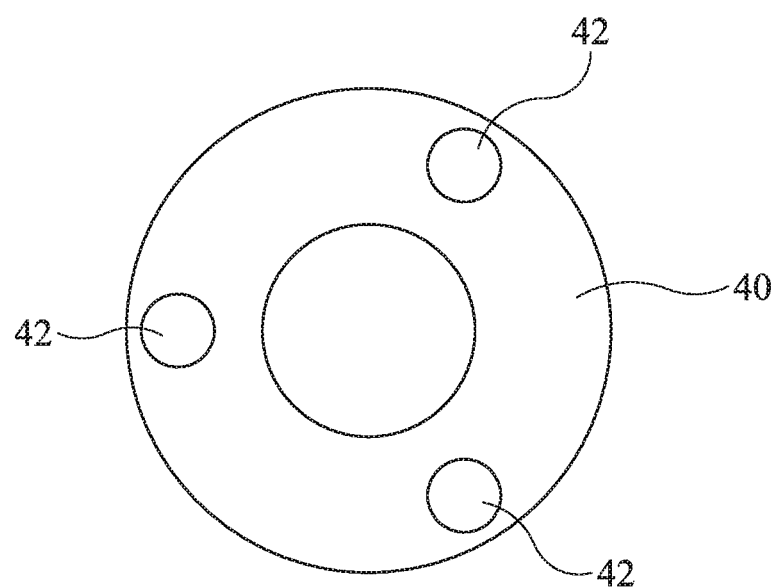
FIG. 8 illustrates a top view of a base for resting bottles thereon within a cylindrical bottle cutter apparatus in an embodiment of the present invention.

FIG. 7 illustrates an exploded view of the cylindrical body 12 and a base 40 that may be positioned on a bottom of the cylindrical body 12. The base 40 may be a disc of smooth material that may be utilized to rest a bottom of the bottle 14 thereon, allowing for the rotating of the bottle 14 while positioned in the body 12. The base 40 may aid in maintaining the bottle in the proper position so that rotating the same may be allow an even circumferential groove to be etched into the bottle 14. The base 40 may made from a material that allows for the easy rotation of the bottom of the bottle 14 thereon, such as thermoplastic material or the like. The base 40 may also protect a tabletop surface beneath the base 40 from becoming scratched or otherwise damaged by the bottle 14. One or more feet 42 may be positioned beneath the base 40 for holding the base 40 on the table top, and preventing rotation of the base 40 as the bottle resting thereupon is rotated by a user during a cutting process. The feet 42 may preferably be made from a gripping material, such as an elastomeric material minimizing slippage thereof.

A gripping tool (not shown) may be utilized to rotate the bottle as the cutting blade 32 etches a groove into the outside surface of the bottle. Specifically, the gripping tool may be an element that attaches to the neck or top of the bottle, and may be made from an elastomeric material, a foam material, or other like material useful for providing a grip for a user to hold onto the bottle and easily control the rotation thereof while etching the groove therein.

The cylindrical bottle cutting apparatus of the present invention may be different sizes to accommodate different sizes bottles. Specifically, the cylindrical body 12 may be sized to accommodate the size of a standard 12 ounce beer bottle. Alternatively, the cylindrical body 12 may be sized to accommodate a standard wine bottle. Of course, other sizes may further be utilized for different sized bottles. In an alternate embodiment, the size of the cylindrical body 12 may be adjustable by increasing or decreasing the diameter thereof so as to accommodate different sized bottles.

In an alternative embodiment of the present invention, one or more spacers may be utilized to accommodate different bottle sizes, such as bottles having diameters significantly less than the diameter of the cylindrical body 12 itself. Although the present invention may be utilized on a bottle having a diameter less than the inside diameter of the cylindrical body 12, it may be difficult to maintain the body in a position where it can be rotated and contact the cutting blade at all points around the bottle.

The spacers (not shown) may be in the shape of a disk or collar having an outer diameter and an aperture in the middle thereof having an inner diameter. The outer diameter may be sized to fit within the cylindrical body 12 relatively snugly, thereby minimizing side-to-side movement of the spacer when positioned within the cylindrical body 12. The inner diameter of the spacer may be sized to receive and fit the outer diameter of the bottle to be etched.

In an embodiment, a first spacer may be positioned at a bottom of the bottle, thereby holding the bottle in the center of the cylindrical body 12, and allowing the cutting blade to etch a groove therearound. The first spacer may either freely rotate within the cylindrical body 12, or may allow the bottle 14 to freely rotate within the cylindrical body 12.

In another embodiment, first and second spacers may be utilized to stabilize a bottle 14 within the cylindrical body 12. The first spacer may be positioned near the bottom of the bottle and the second spacer may be positioned near the top and/or near or around the neck of the bottle 14. Therefore, the top and the bottom of the bottle 14 may be locked into position in the center of the cylindrical body 12 so that when rotated, the cutting blade 32 is able to cleanly etch the groove therein.

In yet another alternative embodiment of the present invention, the one or more spacers may be in the form of a ring having an off-center inner aperture, or may be in the form of an arc or a crescent, having an outer arc portion and an inner arc portion, which may be positioned within the cylindrical bottle 12 to provide a space for a smaller diameter bottle, but allow the bottle to be positioned closer to the cutting blade. Thus, the "thicker" portion of the ring or arc may be placed against the inner surface of the cylindrical body 12 opposite the cutting blade so that the bottle is positioned closer to the cutting blade. Thus, smaller bottles that may be out of reach of the cutting blade may be etched by the apparatus of the present invention.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A bottle cutting apparatus comprising:
   a cylindrical sleeve comprising a sidewall and a first end and a second end;
   a vertical slot within the side wall providing a passage from outside the sleeve to inside the sleeve;
   a slidable sled within the slot, wherein the slidable sled is configured to move up and down within the vertical slot;
   a tightening element on the sled configured to tighten the slidable sled in a position along the vertical slot;
   a shaft disposed through the slidable sled and the slot;
   a cutting blade on a terminal end of the shaft, wherein the cutting blade is configured to score a surface of a glass bottle disposed within the sleeve;
   a spring surrounding the shaft, wherein the spring is configured to bias the shaft away from the sleeve; and
   a magnet on the sled and magnetically engaged to the spring.

2. The bottle cutting apparatus of claim 1 wherein the tightening element comprises a screw and a backplate configured to tighten on an inside surface of the sleeve when the screw is tightened.

3. The bottle cutting apparatus of claim 1 further comprising:
   a spacer within the sleeve, the spacer having an outer diameter and an inner diameter, the outer diameter configured to be positioned adjacent an inside surface of the sleeve, and the inner diameter configured to be positioned adjacent the glass bottle when disposed within the sleeve, the spacer configured to hold the glass bottle in the center of the sleeve.

4. The bottle cutting apparatus of claim 1 wherein the biasing element is a spring surrounding the shaft, wherein the spring is configured to bias the shaft away from the sleeve.

5. The bottle cutting apparatus of claim 4 further comprising:
   a magnet on the sled and magnetically engaged to the spring.

6. The bottle cutting apparatus of claim 1 wherein the shaft is removable from the slidable sled.

7. The bottle cutting apparatus of claim 1 further comprising:
   a base on a bottom end of the sleeve, the base comprising a surface configured to hold a glass bottle thereon.

8. The bottle cutting apparatus of claim 7 further comprising:
   at least one foot on a bottom surface of the base configured to hold the base on a support surface.

9. A system for etching a score line in a glass bottle comprising:
   the bottle cutting apparatus of claim 1; and
   a bottle disposed within the sleeve.

10. A method for etching a score line in a glass bottle comprising the steps of:
    providing a bottle cutting apparatus comprising a cylindrical sleeve comprising a sidewall and a first end and a second end, a vertical slot within the side wall providing a passage from outside the sleeve to inside the sleeve, a slidable sled within the slot, wherein the slidable sled is configured to move up and down within the vertical slot, a tightening element on the sled configured to tighten the slidable sled in a position along the vertical slot, a shaft disposed through the slidable sled and the slot; a cutting blade on a terminal end of the shaft, wherein the cutting blade is configured to score a surface of a glass bottle disposed within the sleeve, a spring surrounding the shaft, wherein the spring is configured to bias the shaft away from the sleeve, and a magnet on the sled magnetically engaged to the spring;
    providing a glass bottle comprising an outside surface disposed within the sleeve;
    pushing the cutting blade against the surface of the glass bottle;
    rotating the glass bottle; and
    etching a score line circumferentially in the outside surface of the glass bottle.

11. The method of claim 10 further comprising the steps of:
    moving the slidable sled along the vertical slot; and
    tightening the slidable sled in a position within the vertical slot via the tightening element.

12. The method of claim 11 wherein the tightening element further comprises a screw and a back plate, wherein the back plate is configured to tighten on an inside surface of the sleeve when the screw is tightened, further comprising the step of:
    tightening the back plate against the inside surface of the sleeve by tightening the screw.

13. The method of claim 10 wherein the bottle cutting apparatus further comprises a pushbutton on the shaft, wherein the pushbutton is configured to push the shaft and the cutting blade within the inside of the sleeve when pressed and a spring surrounding the shaft between the pushbutton and an outside surface of the sleeve, wherein the spring is configured to bias the shaft away from the sleeve, further comprising the step of:

pressing the pushbutton to move the shaft toward the sleeve and engaging the cutting blade with the outside surface of the glass bottle.

14. The bottle cutting apparatus of claim 10 further comprising the step of:

removing the shaft and the cutting blade from the slidable sled.

15. The bottle cutting apparatus of claim 10 wherein the bottle cutting apparatus further comprises a base disposed on a bottom end of the sleeve, further comprising the steps of:

disposing the bottle on the base; and rotating the glass bottle on the base when etching a score line in the outside surface of the glass bottle.

16. The bottle cutting apparatus of claim 15 wherein the base comprises at least one foot on a bottom surface thereof, further comprising the step of:

engaging the foot on a support surface.

17. The method of claim 16 further comprising the step of:

rotating the glass bottle on the base, wherein the base remains unmoving due to the engagement of the foot on the support surface.

\* \* \* \* \*